SUPERVISORY ARRANGEMENT FOR DETECTING FAULTS IN MEANS FOR SELECTING CROSSING POINTS CORRESPONDING TO SWITCHING MEANS IN A READING MATRIX IN A TELECOMMUNICATION SYSTEM CONTROLLED BY COMPUTERS
Filed Feb. 16, 1966 7 Sheets-Sheet 1

INVENTORS
Vilnis Lapsevskis
Ake Bertil Fredrik Svensson
BY Hane and Nydick
Attorneys Jan. 27, 1970 V. LAPSEVSKIS ET AL 3,492,446
SUPERVISORY ARRANGEMENT FOR DETECTING FAULTS IN MEANS FOR SELECTING CROSSING POINTS CORRESPONDING TO SWITCHING MEANS IN A READING MATRIX IN A TELECOMMUNICATION SYSTEM CONTROLLED BY COMPUTERS
Filed Feb. 16, 1966 7 Sheets-Sheet 2

INVENTORS
Vilnis Lapsevskis
Ake Bertil Fredrik Svensson
BY
Hane and Nydick
ATTORNEYS INVENTORS
Vilnis Lapsevskis
Åke Bertil Fredrik Svensson
BY Hane and Nydick
ATTORNEYS SUPERVISORY ARRANGEMENT FOR DETECTING FAULTS IN MEANS FOR SELECTING CROSSING POINTS CORRESPONDING TO SWITCHING MEANS IN A READING MATRIX IN A TELECOMMUNICATION SYSTEM CONTROLLED BY COMPUTERS Filed Feb. 16, 1966 7 Sheets-Sheet 4

INVENTORS
Vilnis Lapsevskis
Ake Bertil Fredrik Svensson
BY Hane and Nydick
Attorneys INVENTORS
Vilnis Lapsevskis
Åke Bertil Fredrik Svensson
BY
Hane and Nydick
Attorneys INVENTORS
Vilnis Lapsevskis
Ake Bertil Fredrik Svensson
BY
Hane and Nydick
Attorneys INVENTORS
Vilnis Lapsevskis
Åke Bertil Fredrik Svensson
BY
Hane and Nydick
ATTORNEYS United States Patent Office
3,492,446
Patented Jan. 27, 1970

3,492,446

SUPERVISORY ARRANGEMENT FOR DETECTING FAULTS IN MEANS FOR SELECTING CROSSING POINTS CORRESPONDING TO SWITCHING MEANS IN A READING MATRIX IN A TELECOMMUNICATION SYSTEM CONTROLLED BY COMPUTERS

Vilnis Lapsevskis and Åke Bertil Fredrik Svensson, Hagersten, Sweden, assignors to Telefonaktiebolaget LM Ericsson, Stockholm, Sweden, a corporation of Sweden Filed Feb. 16, 1966, Ser. No. 527,818
Claims priority, application Sweden, Mar. 8, 1965, 2,979/65
Int. Cl. H04m 3/22
U.S. Cl. 179—175.21 4 Claims

ABSTRACT OF THE DISCLOSURE

In a telecommunication system controlled by two computers working in parallel, the condition of different switching means in the system is detected by sensing crossing points in a reading matrix, each crossing point corresponding to one of the switching means. Rows in the reading matrix are selected by selecting crossing points in a selecting matrix. The crossing points in the selecting matrix are selected by means of code translating means, each belonging to one of the computers and carrying out selecting operations in the selecting matrix in parallel. A control column is arranged in the reading matrix to produce a control signal each time a row is selected. If no control signal is obtained, the code translating means are switched off alternatingly in order to find out if the fault is located in any of the code translating means. If in neither of these cases a control signal is obtained, the fault is located in the selecting matrix, which indicates that the selecting matrix must be disconnected.

Figure 1:
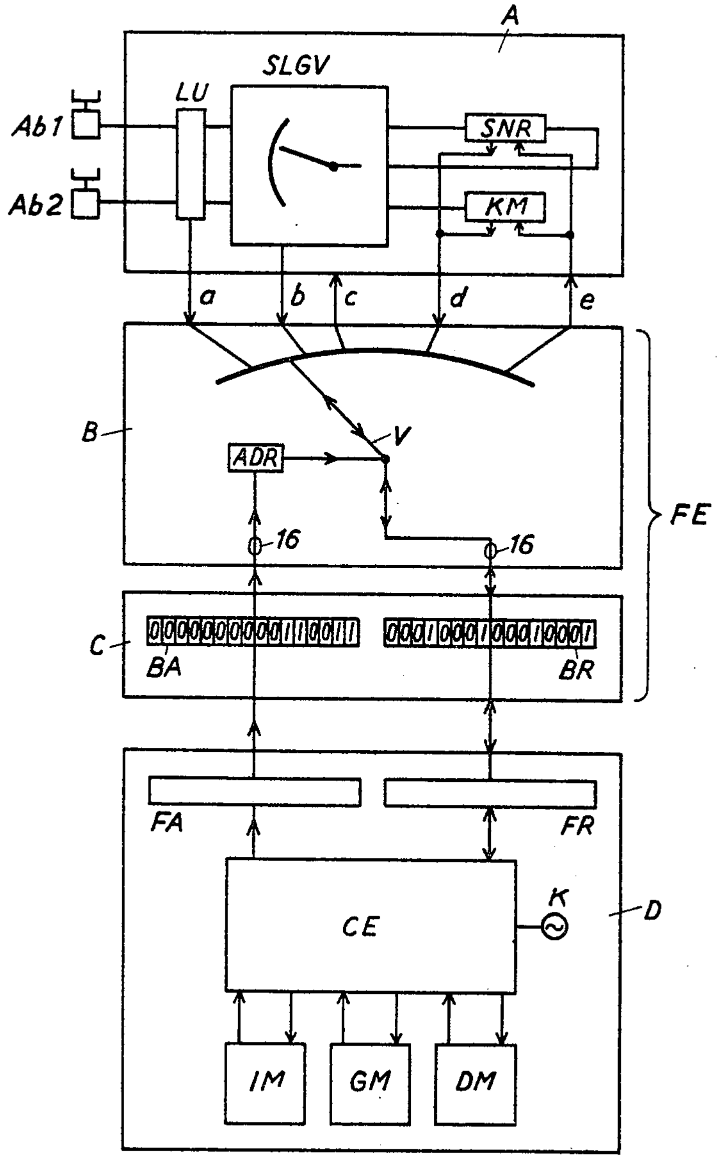

The present invention refers to a supervisory arrangement for detecting faults in an automatic telecommunication system controlled by means of at least two computers or other electronic control means.

A telecommunication system of the above mentioned type comprises a transfer unit that transforms into binary information potentials which are obtained from different means (subscriber's equipment, line equipment, selectors, etc.) included in a connection. These voltages or potentials indicate the idle and the busy condition, respectively, of said means. The binary information has such a form that it can be sensed by the computer. The transfer unit furthermore transforms binary information obtained from the computer into signals for controlling different switching means. The computers work simultaneously in order to allow a supervision by permanent comparison of their results. The computers obtain simultaneously the condition-indicating binary information and they supply simultaneously the binary information required for the control of the switching means.

The states of the different switching means are represented by sensing points arranged in matrices. The points may have two alternative potential conditions, so that each row forms a binary condition reading word. These rows are selected individually by the two computers simultaneously by means of a binary position selecting word assigned to the respective row in such a way that this word, in two signal code translating means each cooperating with respective computer, is converted into a selecting signal. The selecting signal activates the required row in the reading matrix by means of a selecting matrix wherein a reading pulse is sent from a point activated in the selecting matrix to this row.

In such a telecommunication system it is essential to be able to localize a fault rapidly and to disconnect the defective part without affecting the function of the other parts. A control indicating that the required row really has been selected is necessary and if this has not been done the fault can be located in the selecting matrix, in the reading matrix or in the signal code translating means belonging to the respective computer.

An object of the invention is to permit the localizing of said fault. This is effected according to the invention by providing each of the reading points with at least one capacitor that is charged according to one or the other of the two alternative conditions of the switching means belonging to the point. Each of the charged capacitors upon obtaining a reading signal generates a signal on its associated column wire. The reading matrix comprises at least one control column. At its crossing points with the row wires there are arranged capacitors which, upon obtaining a reading signal on the column wire belonging to the control column, produce a control signal. The reading matrix also includes at least one control row. At its crossing points with the columns there are capacitors, some of which are always charged, so that upon selection of said control row a definite reading word is obtained simultaneously with a control signal from the control column. Each computer upon failing to receive a signal from the control column sends a binary word for selecting the control row and upon obtaining the control signal as a result of the selection of the control row sends a disconnection signal for the disconnection of the signal code translating means belonging to one of the computers and then the original selecting word. Upon further failing to receive the control signal, the computer sends a connection signal for the connection of the disconnected signal code translating means and then again the original selecting word, so that depending on whether the control signal is obtained or not upon selection from both or from only one of the computers it may be determined whether the fault is located in the control column, in the selecting matrix or in one of the two signal code translating means.

Figure 2:
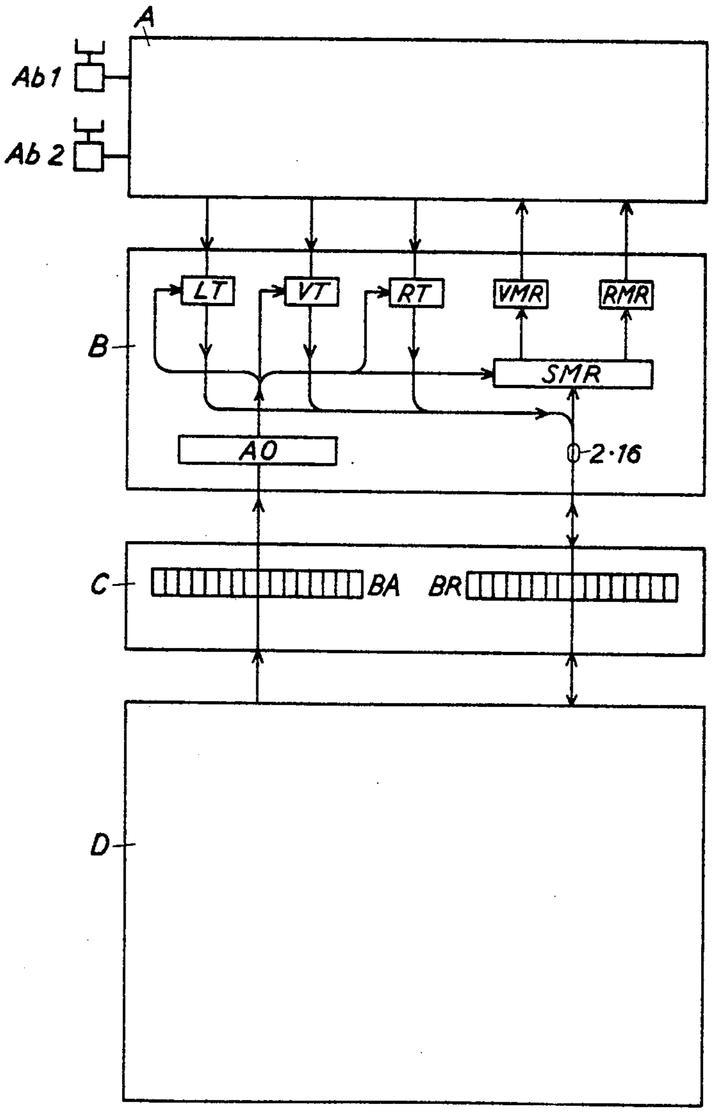
Figure 3:
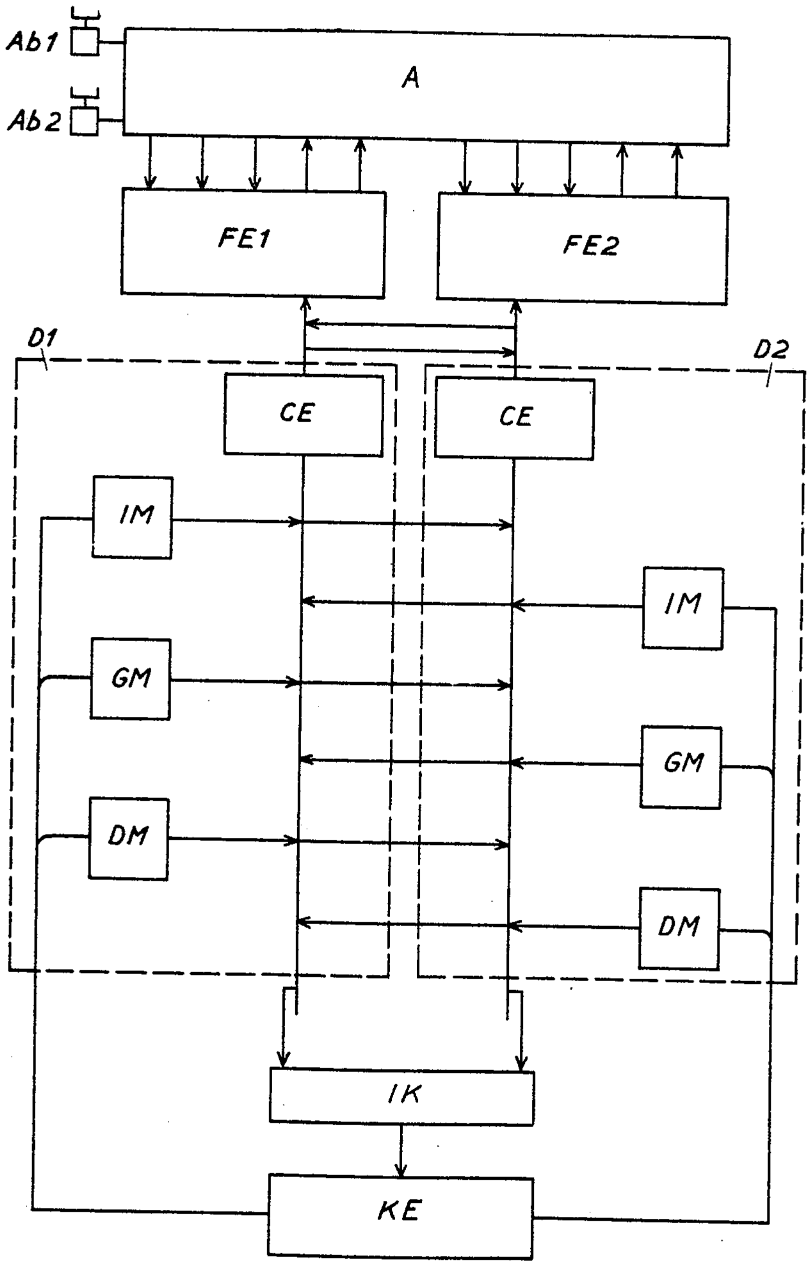
Figure 4:
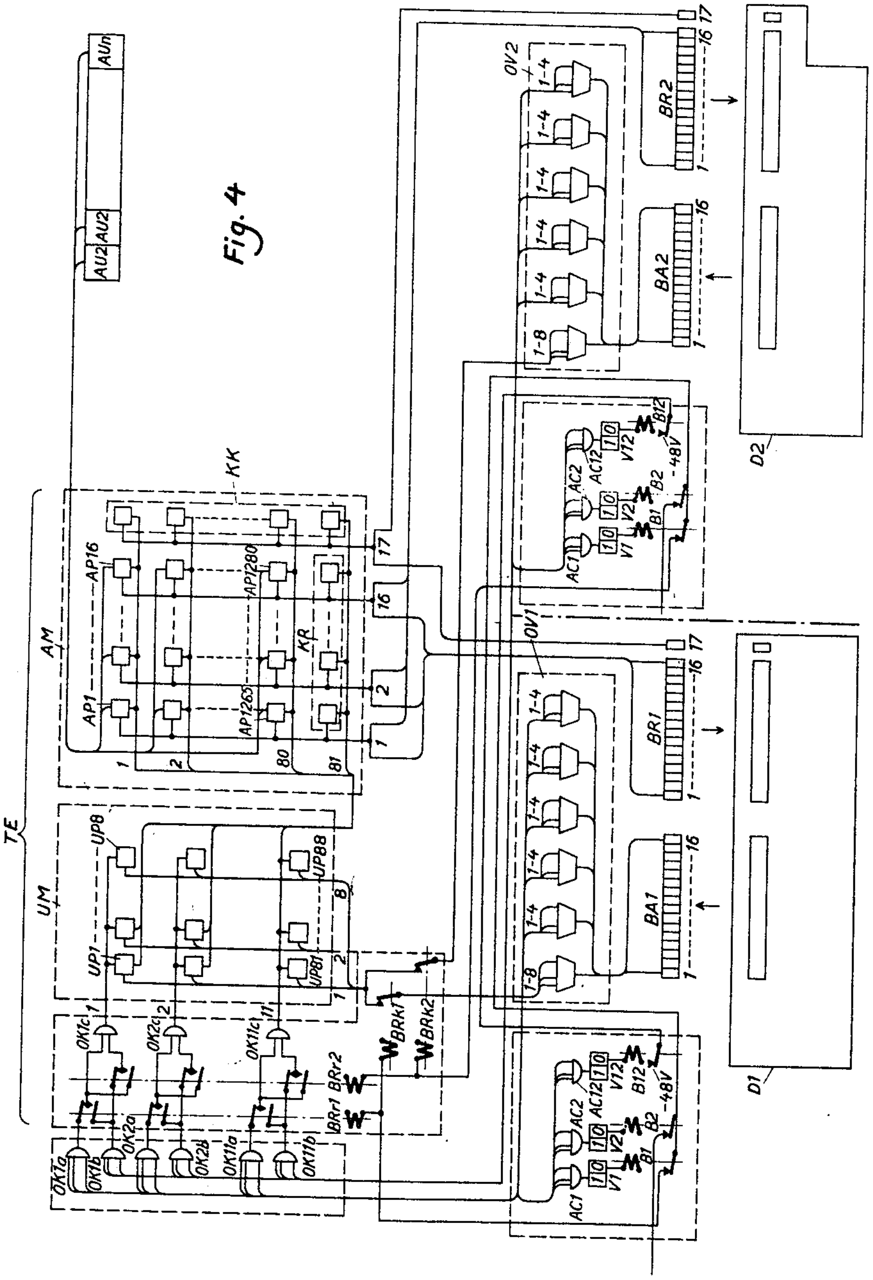
Figure 5:
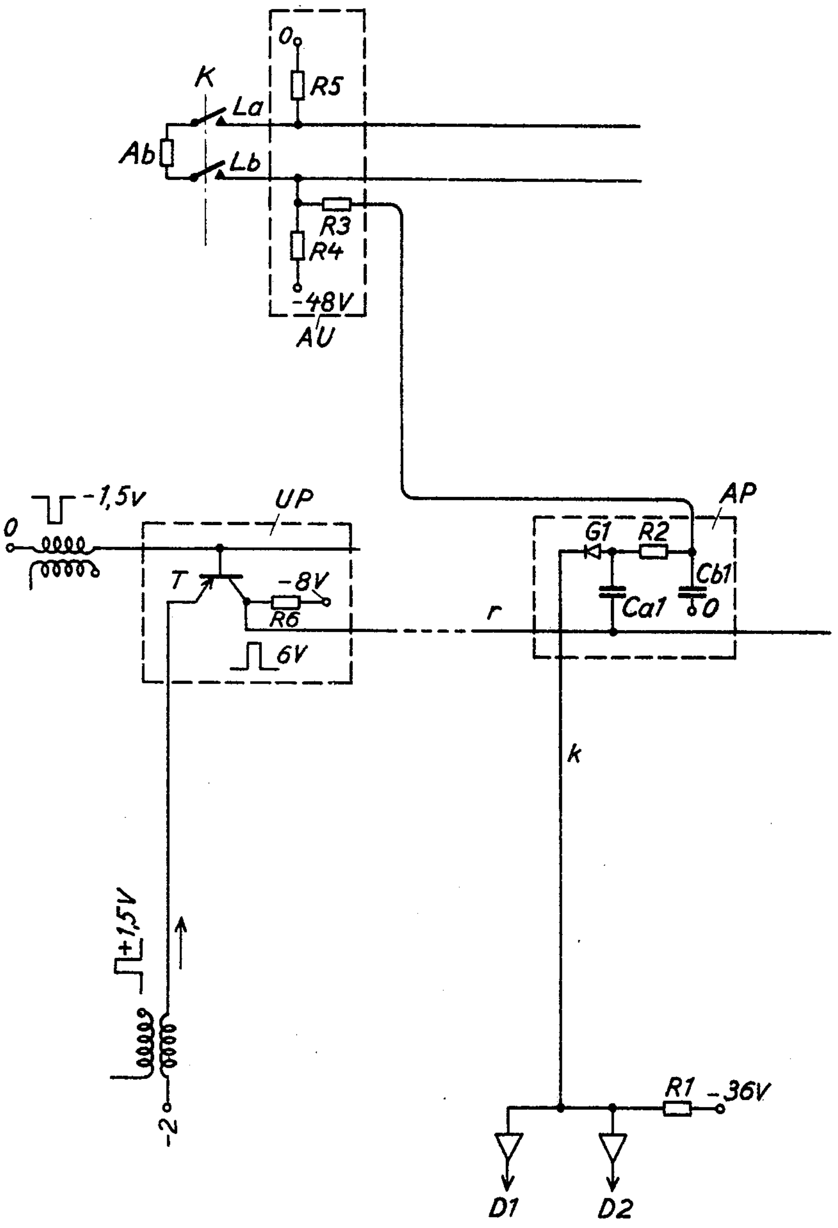
Figure 6:
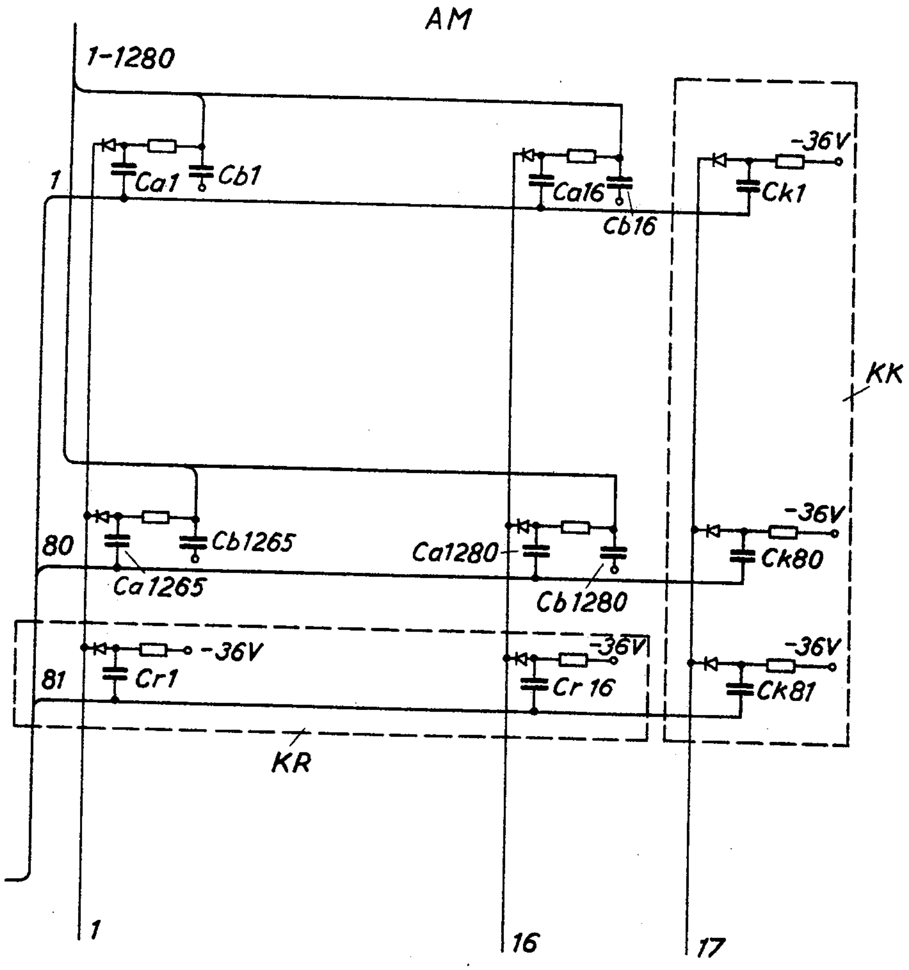
Figure 7:
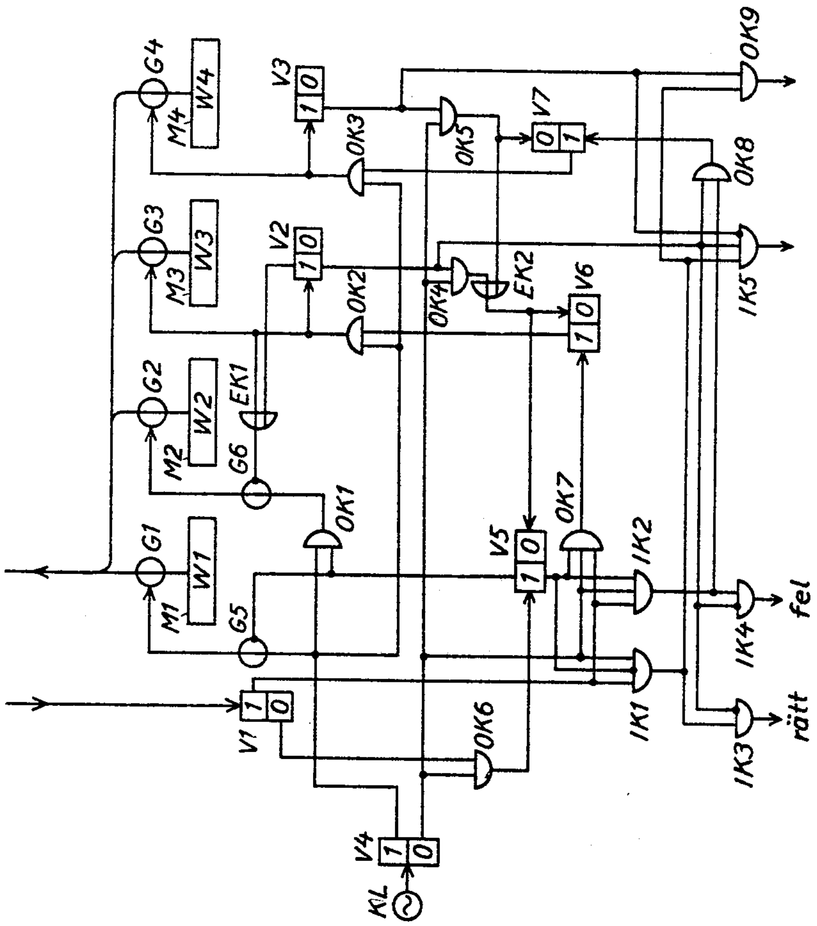

The invention will be explained hereinbelow in greater detail, by means of an embodiment, with reference to the accompanying drawing in which FIG. 1 shows a block diagram of a computer controlled telephone system, FIG. 2 shows the block diagram according to FIG. 1 with the transfer unit shown in greater detail, FIG. 3 shows a block diagram of a telephone system which is controlled by two cooperating computers, FIG. 4 shows a test unit from which the computers obtain information in the form of a binary word concerning the condition of the switching means and concerning the two signal code translating means cooperating with respective computers, FIG. 5 shows a crossing point in the selecting matrix and in the reading matrix in greater detail, FIG. 6 shows the reading matrix with a control row and a control column and FIG. 7 shows a logic circuit by means of which the supervision function is explained.

FIG. 1 shows diagrammatically the three main parts of a computer controller- or stored-program controlled telephone exchange. By A is indicated a telephone network of for example conventional type, comprising selector stages SLGV, digit receiving means KM and junction relay sets SNR by means of which a calling subscriber *Ab*1 can be connected with a called subscriber *Ab*2. Compared with a conventional telephone exchange this exchange has however no control means and all test functions and the selection of a connecting path are instead carried out by means of a computer D. The computer obtains information regarding the identity of the subscribers and of the switching means together with the information as to their occupied or idle condition in the form of binary numbers. Then the computer selects from a list that comprises sequentially all connecting paths which can come into question for the setting up of a connection between two required points in the telephone exchange the connecting path next in turn in which all switching means are idle. Thereafter it operates all means comprised in the selected connecting path, by sending control instructions in the form of binary words. Thus there are binary information words concerning the condition of the lines and of the relays which words are supplied to the computer, and binary information words which are transmitted from the computer to the telephone exchange in order to operate the switching means. This may be performed in both directions, for example in the form of 16-digit binary words.

In view of the great difference between the operational speed of the computer by means of which the binary words that control the switching means are produced, and the operational speed of the relays and of the selectors, a transfer unit FE is necessary. The transfer unit stores the information obtained from the computer until the slowly operating means have been operated and stores the information referring to condition obtained from the telephone network until said information has been supplied to the computer as will be described in greater detail. The binary words that contain information regarding the condition of the switching means and the binary words that contain information regarding the switching means which are to be operated respectively, do not necessarily refer to individual means but also to groups of means (subscriber's equipments, selectors, etc.). According to the example the words are associated with 16 individual means, one means per bit wherein the idle condition of a switching means is represented by, for example, 0 while the busy condition is represented by 1. In a similar manner 1 can imply that the switching means corresponding to this bit or digit position in the word obtained from the computer is to be operated while the means corresponding to a digit position which has a 0, is not operated in the respective 16-means group hereinafter called a 16-group.

To be able to find the 16-group from which test information is to be obtained and to which the control instruction is to be sent, respectively, an address information is required, for which purposes also a word containing 16 binary digits is used. This is indicated in FIG. 1 diagrammatically by means of a selector symbol V that shows that the 16 junction lines which supply the condition information to the computer and supply the control information from the computer to the switching means respectively, can be connected to those means whose position is defined by the address information given by the computer and which information is obtained through 16 other lines. The connecting paths *a–e* to and from the telephone network indicate 3 sensing functions, viz. sensing the condition of subscriber's equipments (a), sensing the condition of selectors (b) and sensing the condition of connecting circuit relay sets SNR or of digit receivers KM (d), and 2 control functions, viz. operation of selectors (c) and operation of connecting circuit relay sets and digit receivers (e). These functions are sufficient for explaining the fundamental operation of the system.

The transfer unit FE consists of two parts one of which, B, contains means which can cooperate with the rather slow electromechanical means, for example the relays in the telephone network, and the other part C contains buffer means which can store the high speed information obtained from the computer and forward it to those parts which drive the relays and the selectors. The parts B and C of the transfer unit may be located remote from each other, for example at a distance of about 100 meters, the part B being located near or in the telephone network itself while the part C is located in the computer D.

In FIG. 1, there are two buffers shown in the transfer unit FE of which the address buffer BA connected through 16 conductors with an address register FA, into which the computer supplies the calculated address in the form of a 16-digit binary word, and the other, the result buffer BR, connected through 16 conductors with a result register FR into which the computer supplies the calculated operating information in the form of a 16-digit binary word and to which register the information concerning the condition sensed in the telephone network is supplied respectively from the transfer unit FE. According to FIG. 1 in the address buffer BA as an example is written an address, the binary word 0000000000110011. Simultaneously in the result buffer BR is written the binary word 0001000100010001 which for example, can indicate that in a group of 16 switching means, for example selectors, the identity of which group is defined by said address the first, fifth, ninth and the thirteenth selector are busy while the others are idle. The binary number written in the result buffer BR can however also contain an information word in coded form, for example the binary number 0000000000111111 implying that, for example, in a switching means selected by the address which means contains several relays, certain relays are to be operated.

As mentioned before, in the transfer unit, means are necessary which can be operated by the information obtained in rapid succession from the computer and which store this information until it has had time to operate relays or selectors through a relatively slower means. This is apparent from FIG. 2 which shows the transfer unit somewhat in greater detail than FIG. 1. The means which can store the information words obtained in rapid succession from the computer and herebelow are called fast operation units, are indicated by SMR. By VMR is indicated a selector control relay set and by RMR a relay operating relay set which two last mentioned sets obtain their operating signals from unit SMR. Also those means are indicated which feed information to the computer regarding the condition of the respective means. These are a line test device LT, a selector test device VT and a relay test device RT. These three last mentioned devices do not require any transfer means in the direction of the computer due to the difference in operational speed as the sensing can be performed at the rate determined by the computer. The transfer unit comprises also a decoding means AO that converts the binary address information obtained from the computer into a single line position and vice versa.

It should be emphasized that a fast operation relay set SMR can serve simultaneously a number of slow units VMR, RMR, for example 10, and the number of the relay sets SMR is sufficiently great to be able to receive sequentially all the information obtained from the computer with great rapidity and to store it until an operation has been carried out by the slow unit utilized. If a unit SMR has become busy the next idle unit SMR will be used by the computer on the basis of the available condition information.

In order to obtain operational reliability the system contains two computers which work in parallel and carry out all test and control functions simultaneously. If a deviation arises between the calculated result of the two computers, this implies that one of the computers is defective. The defective computer is determined by each computer performing the same test program and the computer that produces a faulty result is disconnected by the other computer. Such a technique of paralleling computers is known per se. See, for example, The Bell System Technical Journal, vol. 43, September 1964, part I "No. I ESS Maintenance Plan," pages 1961–2019 and especially pages 1985–2002.

FIG. 3 shows diagrammatically how two computers D1 and D2 control parallelly the same telephone network A. Operating information is supplied from both computers to the fast operation unit SMR in the transfer units FE1 and FE2 and the condition information from the network is supplied to both computers through the transfer units FE1 and FE2 respectively. By IM is indicated an instruction memory in each computer in which memory the instruction list is written, by GM is designated a memory for the basic constants and by DM a data memory in which recording is carried out regarding the condition of the different means during the arithmetical operations. By CE is designated a control unit in which the arithmetical operations are performed. By IK is indicated a comparator circuit and by KE a control circuit which, dependent on the comparison of the results of the two computers disconnects the defective units. In view of the fact that the computers, per se, are not the object of this invention a detailed description of their function is not necessary.

It is to be noted that the supervisory arrangement according to the invention is intended to locate a fault in the transfer unit FE itself, i.e. it is presupposed that the binary information sent out from both computers is correct and has been controlled by means of the above mentioned mutual control function of the two computers.

In FIG. 4 TE designates a test unit that for example, is intended to produce information regarding the busy or the idle condition of the subscriber's equipments AU1, AU2 which is readable by the computer. There is however no difference if the condition of relays, selectors or other switching means is to be read. The test unit contains a reading matrix AM in which each crossing point corresponds to one of the switching means whose condition is to be tested. Said points are selected row by row by the computer by supplying a pulse-shaped signal to a row wire belonging to the respective row. Associated with each point is a capacitor which, when receiving said pulse-shaped signal, can be discharged, if it has been charged due to the busy condition of the subscriber's equipment belonging to respective point, as it will be explained in connection with FIG. 5. Thus from the column wires that belong to points with charged capacitors a pulse-shaped signal will be obtained, so that the computer, in accordance with the row read out by means of the pulse, obtains a binary reading word containing information regarding the idle and the busy condition, respectively, of the subscriber's equipments belonging to the row.

FIG. 5 shows a circuit belonging to each of the reading points AP in the matrix AM in FIG. 4. By *r* is designated a wire belonging to the row, by *k* is designated a wire belonging to the column and by C*a*1 a capacitor. One terminal of the capacitor is connected to the row wire and the other is connected to the column wire as well as to the subscriber's equipment AU belonging to the crossing point, from which subscriber's equipment two different voltages are obtained alternatively in dependence on its busy or idle condition. The voltage of the capacitor C*a*1 is determined by the voltage drop in the circuit extending from a voltage source which according to the example is −36 v., a resistance R1, the column wire *k*, the rectifier G1 for isolating the capacitor from reading the other rows, a resistance R2, resistance R3 and a resistance R4 in the subscriber's equipment to a voltage source of for example −48 v. Upon replacing the handset when thus no voltage drop arises in the circuit extending through the cradle contact and the resistance R5, the voltage drop through the resistance R4 is negligible. By voltage division it is possible to obtain in the connecting point of the capacitor a voltage that for example is lower than −42 v. Upon lifting the handset a voltage drop arises through the resistance R4, so that the voltage in the connecting point of the capacitor will be only −36 v. The reading pulses obtained through the row wire *r* have an amplitude of 6 v., which implies that when the voltage of the capacitor C*a*1 is lower than −42 v., the voltage of the reading pulse will not be sufficient to be able to pass through the rectifier G1 and therefore no pulse is obtained through the column wire. If on the contrary the capacitor has the voltage corresponding to busy condition, i.e. −36 v., its voltage will increase with the amplitude of the obtained pulse and a pulse is obtained through the column wire.

Supplying of the reading pulses to the reading matrix AM is carried out by means of a selecting matrix UM (FIG. 4). In this matrix each crossing point corresponds to a row that is to be read in the reading matrix, and these crossing points are activated when the row wire and the column wire belonging to respective crossing point obtain simultaneously a pulse-shaped signal due to a binary selecting information obtained from the computer. A circuit belonging to a crossing point UP in the selecting matrix UM is shown in FIG. 5. According to the example the circuit comprises an NPN-transistor T the base of which is connected to the row wire and the emitter of which is connected to the column wire and the collector of which is connected through a resistance R6 to a voltage source of −8 v. and furthermore to the row wire in the reading matrix AM which is to be selected. In the absence of incoming pulses the transistor is blocked and the reading wire in the reading matrix, belonging to the transistor has a voltage of −8 v. When a transistor is to be activated in correspondence to the selecting signal obtained from the computer, the row wire obtains a pulse of for example +1.5 v. and the column wire a pulse of for example −1.5 v. whereby the transistor becomes conducting and the selected row wire in the reading matrix obtains a pulse of +6 v. that passes through all capacitors in the reading matrix associated with busy subscriber's equipments. The reading matrix comprises for each crossing point a further capacitor C*b*1 that is considerably larger than the capacitor C*a*1. Capacitor C*b*1 and resistor R3 form an integration circuit as protection against disturbances. In addition it functions to store the information obtained from the subscriber's equipment, if a new sensing of the condition should be necessary after the capacitor C*a*1 has been discharged and also to charge last mentioned capacitor rapidly.

As has been mentioned earlier in connection with FIG. 2 the pulses obtained through the column wires in the reading matrix form for example a 16-digit information word regarding the condition of the 16 switching means belonging to the row and this word is supplied at first to a buffer BR and from there to the computer which uses the binary word for the continued calculation.

The selecting word that selects the row to be read out is fed from the computer to an address buffer BA but this word must first be code translated in a suitable manner to be able to select a row and a column in the selecting matrix UM. The code translation can be carried out in many different manners. According to the example the selecting matrix has 11 rows and 8 columns, which are selected in such a way that 3 binary signals are translated into a 1 out of 8 group and are used to select a column while 5 groups each consisting of 2 binary signals are translated into a 1 out of 4 group and thus give the possibility to select $4^5$ rows. It is pointed out that there is a great number of other selecting matrices and said $4^5$ combinations are used to select a row in all these matrices.

As it is indicated in FIG. 4 there belongs to each computer a signal code translating means OV1 and OV2 respectively, each of which supply their signals to the rows and the columns of the selecting matrix. For the first row this occurs through an and-circuit array indicated as consisting of three and-circuits OK1*a*, OK1*b* and OK1*c*. The output condition of these circuits is that from each computer 5 signals, thus altogether 10 signals, have been received. If one of the 10 signals does not appear no selection takes place which will have the consequence that the fault locating process according to the invention is started as it will be explained herebelow. Supplying of signals to the rows and to the column is effected through contacts of cut-off relays BR*r*1, BR*r*2 and BR*k*1, BR*k*2 respectively which normally are held operated, but those two relays of the group are disconnected through the contacts of which the selecting pulses from the defective transfer unit are obtained. This is indicated by means of bistable circuits V1, V2 and V12 which in one of their two positions maintain the relays B1, B2 and B12 operated. The bistable circuits are controlled by means of and-circuits AC1, AC2 and AC12 which are activated in a similar manner as the and-circuits OK1*a*, OK1*b*, etc. belonging to the rows of the selecting matrix by a simultaneous occurrence of 5 signals obtained from the signal code translating means OV1, OV2 and which disconnect the respective relay upon obtaining said signals. Of the relays, relay B1 has the purpose of supplying a voltage for holding the relays BR*r*1 and BR*k*1 in the selecting matrix shown in FIG. 4, relay B2 is intended to supply a holding voltage to corresponding relays in another selecting matrix belonging to other switching means, for example relays, and is not indicated in FIG. 4. There may be found a large number of such relays corresponding to the number of selecting matrices, i.e. test units included in a telephone exchange. The relay B12 has the purpose of disconnecting the holding current of all test units which are controlled by the transfer unit belonging to the computer D2, if some fault should make this necessary. In the same manner as has been described hereabove in connection with the computer D1 the relays BR*r*2 and BR*k*2 may be disconnected by means of the relay B1 in the transfer unit of the computer D2 and by releasing the relay B12 in this transfer unit the current supply to relays B1, B2 and in the transfer unit of the computer D1 will be stopped.

As mentioned before the computers obtain the information concerning the condition of the subscriber's equipments in the form of 16-digit binary words. By reading out 80 rows with each 16 points in the reading matrix an information is obtained concerning the idle or the busy condition of 1280 subscribers. To be able to insure that a row has really been selected, and if not, to control where the fault is located, the reading matrix AM according to the invention is provided with a control column KK and a control row KR as is indicated in FIG. 4 and FIG. 6. The control column KK contains in correspondence to each row a capacitor C*k*1, C*k*2, etc. These capacitors which are identical with the capacitors C*a*1, C*a*2, etc. belonging to the other crossing points in the matrix but which are at their connecting point with the column wire are always connected to −36 v. Their purpose is that they, upon obtaining the reading pulse, always act in the same manner as a crossing point that indicates busy condition, i.e. they feed a pulse to the column wire. The pulse from the control column forms a particular binary control digit that is transmitted to the computer as a 17th bit together with the 16-digit binary information from the 16 columns. Upon reading a row by means of a reading pulse, a signal is not always obtained because it is possible that all 16 switching means, for example subscriber's equipments, are idle and the binary word obtained is 0000000000000000. On the other hand a pulse must be obtained, the binary digit 1 in the 17th bit position as a control that a row has really been selected. If the computer should not obtain the binary digit 1, this implies that a control function must be carried out in order to ascertain where the fault is located. In order to be able to carry out a control function the reading matrix AM contains a control row KR (FIG. 4, FIG. 6) that can be selected by the computer by means of a particular address and which in the same manner as the control column contains in each of its crossing points with the columns a capacitor C*r*1, C*r*2, etc. Certain ones of these capacitors, for example every second, are, in the same manner as the capacitors C*k*1, C*k*2, etc. in the control column continuously connected to −36 v. On supplying a reading pulse to the control row which can be for example the 81st the word 0101010101010101 is obtained and simultaneously it is expected that the 17th bit will be 1. If the 17th bit should be 0, this implies that the control column itself has been defective, which does not necessitate any special measure excepted that the control function of this test matrix is left out of consideration. If the control bit is 1, this implies that the fault must be located either in the selected crossing point UF of the selecting matrix or in one of the signal code translating means OV1 or OV2 cooperating with their respective computer. Now the signal code translating means OV1 of the computer D1 cooperating with the test unit is disconnected by sending a binary information that disconnects the relay B1 and thus the relays BR*r*1 and BR*k*1, and then again the address selecting signal is sent at which the absence of the 17th bit has been stated. If now 1 is obtained from the control column this implies that the now disconnected signal code translating means is defective, so that it is maintained disconnected.

If after the disconnection of unit OV1, 0 is still obtained from the control column, the examination must continue in such a way that now from the computer a binary word is sent that disconnects the relay B2 in the transfer unit whereby the relays BR*r*2 and BR*k*2 release so that only the selecting information obtained from the computer D1 operates the selecting matrix. If 1 is obtained in the control column, unit OV2 was defective and it is maintained disconnected. If on the other hand 0 is obtained in the control column this implies also in this case that the function of the selecting point in the selecting matrix is faulty.

The function described hereabove is explained by means of a logic circuit according to FIG. 7. It is however obvious that a computer can be programmed in such a way that it controls the functions required for performing the control process. The fundamental idea is found in the relation of the different supervision functions and not in the fact by which means said supervision functions are controlled.

In FIG. 7 M1, M2, M3 and M4 designate memories in which each, for example a 16-digit binary word W1, W2, W3 and W4, is registered. These words can be transferred to the buffer register BA of the test unit TE by opening the gates G1, G2, G3 and G4. By V1 is indicated a control bistable circuit that normally is in 0-position but which when obtaining a binary 1 from the control column is set to 1-position. The word W1 registered in the memory M1 represents the address of the row in the reading matrix, for example the row *r*1 the 16 subscriber's equipments belonging to which are to be sensed in order to determine which of them are idle and which are busy. The word W1 is sent to the signal code translating means OV1 and OV2 where the word is translated in order to select the crossing point UP1 in the selecting matrix UM. The logic circuit according to FIG. 7 comprises a clock device KL which periodically, for example with an interval of a few microseconds, changes the conditions of a clock controlled bistable circuit V4 from 0-position to 1-position and back. When the bistable circuit V4 is in 1-condition a pulse will be sent to the gate G1 that is opened, so that the word W1 from the memory M1 can be transferred to the buffers BA1, BA2 of the transfer units after which the selection of the word is carried out in the manner earlier described. If the selection of the reading row has been carried out correctly, the bistable circuit V1 obtains a signal from the control column whereby the inhibit-circuit IK1 obtains a signal. When the clock controlled bistable circuit during the next period of the clock device is restored to 0-position, the inhibit-circuit IK1 obtains its second input condition and with regard to the fact that the inhibiting condition does not exist, it becomes activated and activates the inhibit-circuit IK3. In consequence of this it is indicated that the selecting function has been carried out correctly.

If no signal is obtained from the control column this implies that a fault exists. When the clock restores the bistable circuit V4 to 0-position, the and-circuit OK6 is activated, as both input conditions are fulfilled and the bistable circuit V5 is set to 1-position. Due to this, the inhibit-circuit IK2 and the inhibit-circuit IK4 are activated, which last-mentioned circuit indicates that there is some fault. When the clock controlled bistable circuit V4 is set to 1 during the next period, the signal to the gate G1 is inhibited by means of the inhibiting gate G5, so that the word W1 is not sent to the transfer unit. The gate G2 on the other hand is activated by means of the and-circuit OK1 and the word W2 that represents the address of the control row, for example the row 81, is sent to the transfer unit. Because of this, the crossing point UP81 is selected in the selecting matrix and upon reading it is expected that the control word belonging to the control row *r*81 is obtained and furthermore that a signal is obtained from the control column. If, in this case no signal is obtained from the control column, the and-circuit OK6 will again be activated and the inhibit-circuit IK4 is activated in the same manner as in the preceding case. This implies that the fault must be located in the control column, so that its function must cease.

If when sending the control word W2 a signal should have been obtained from the control column, this implies that upon the restoring of the clock controlled bistable circuit V4 to 0-position, the and-circuit OK7 is activated, the bistable circuit V6 is set to 1, so that when the bistable circuit V4 is set to 1, the and-circuit OK2 will be activated. Owing to this, the sending of the word W2 from the memory M2 is inhibited and the gate G3 is activated which implies that the word W3 is sent. Owing to this, the signal code translating means OV2 cooperating with the computer D2 is disconnected and only the selecting words coming from the computer D1 can activate the selecting matrix. Upon restoring the clock bistable circuit V4 to 0-position, the bistable circuit V6 and the bistable circuit V5 are set to 0. The gate G3 is not actuated any longer and the word W3 cannot be sent any more. Upon switching the clock bistable circuit V4 to 1-position, the original selecting word at which the fault has first been stated, will be sent again but now the signal code translating means OV2 is disconnected. If now a signal is obtained from the control column the inhibit-circuit IK1 will be activated again but the inhibit-circuit IK3 cannot be activated due to the inhibiting function from the circuit V2. On the other hand, the inhibit-circuit IK5 will be activated and it indicates that the signal code translating means OV2 was defective.

If not either in this case any signal should be obtained from the control column which implies that the bistable circuit V1 is maintained in 0-position, the bistable circuit V5 will be set to 1 and the and-circuit OK7 is activated and it sets the bistable circuit V6 to 1-position. The inhibit-circuit IK2 is activated and the and-circuit OK8 is activated as an indication that the fault can be located in means OV1. Hereby the bistable circuit V7 is set to 1, the and-circuit OK3 is activated and the gate G4 is opened in order to send the word W4 that disconnects the signal code translating means OV1. Upon the next 0-setting of the clock bistable circuit V4, the and-circuit OK5 is activated, the bistable circuit V7 is set to 0, whereby the gate G4 is closed. At the same time the bistable circuits V6 and V5 are set to 0. Upon the next 1-setting of the clock controlled bistable circuit V4 the original address word W1 will again be sent. If now a signal is obtained from the control column, so that the bistable circuit V1 is set to 1, the inhibit-circuit IK1 will be activated. This causes the activation of the and-circuit OK9 to indicate that the fault was located in the signal code translating means OV1.

Should, on the other hand, no signal have been obtained from the control wire, the bistable circuit V1 is maintained in 0-position and no signal will be obtained on any of the four outputs. This implies that the fault must be located in the crossing point of the selecting matrix, i.e. in the circuit belonging to the crossing point. This necessitates disconnection of the selecting matrix and insertion of a new selecting matrix.

It is of course possible to use several, for example, two control columns and two control rows. The two control columns can be intended for control of the even and the odd rows, respectively, whereby the fault can be localized with greater accuracy and short-circuiting between adjacent rows can be indicated. Upon use of two control columns two control rows are of course necessary each of which cooperates with its separate control column and their written information can suitably form bit complements to each other, whereby a control of the outputs of the respective columns is obtained.

It is evident that by means of the supervisory device according to the invention it is possible to locate a fault very rapidly so as to be able to determine which parts have to be exchanged and which parts can continue their function. If the function explained hereabove by means of logic circuits is performed by means of computers, a disconnection of the defective part and an indication of the place of the fault will follow immediately after the localizing of the fault, so that a replacement can be carried out immediately.

We claim:

1. A supervisory arrangement for detecting faults in an automatic telecommunication system controlled by at least two computers, said telecommunication system comprising switching means, each of said switching means having an output indicating two alternative potentials depending on the idle and the busy condition respectively of the respective switching means, said supervisory arrangement comprising a plurality of reading matrices including row conductors and column conductors, the crossing points of said conductors including means connected to one of said outputs so as to allow sensing of one of said two alternative potentials, the crossing points of said conductors included in a row forming by their potentials a binary condition-reading word representing the busy or the idle condition respectively of a definite group of switching means, a selecting matrix having row conductors and column conductors, each of whose crossing points cooperate with a row conductor in one of the reading matrices to produce, by means of an activating signal supplied from one of said crossing points in said selecting matrix to its respective row conductor in the reading matrix, reading signals on the column conductors of the reading matrix, each reading signal representing a binary position in said condition-reading word, at least two code translating means each belonging to one of the computers, said code translating means, upon obtaining a first binary word from the respective computer activating a definite crossing point in said selecting matrix so as to produce said activating signal, each of said reading matrix crossing points including a capacitor charged in dependence on one of said alternative potentials of said output and generating a signal on its column conductor when obtaining said activating signal through its row conductor, at least one control column in each of the reading matrices having a column conductor and crossing points with each of the row conductors in the reading matrix, said crossing points including capacitors which upon supplying said activating signal to the respective row conductor produce a control signal on the column conductor of the control column, and at least one control row having a row conductor and crossing points with each of the column conductors in the reading matrix, said crossing points including capacitors of which definite ones always are charged so as to produce upon supplying said activating signal to the row conductor of the control row a condition-reading control word on the column conductors of the reading matrix simultaneously with said control signal from the control column, failure of said control signal from the control column causing means in the computers to send a second binary word to said code translating means for selecting one of said control rows and to produce said condition-reading control word simultaneously with said control signal from the control column, reception of said condition-reading control word causing means in the computers to send a third binary word for disconnecting the code translating means belonging to one of the computers followed by said first binary word and further failure of said control signal causing means in the computers to send a fourth binary word for disconnecting said other code translating means followed by said first binary word, said process allowing to determine whether the fault is located in the control column, in the selecting matrix or in one of the code translating means and allowing in the last mentioned case the function of one of the computers to continue undisturbed.

2. A supervisory arrangement according to claim 1 wherein the number of the control columns and of the control rows are at least two, one control column cooperating with the even rows and one control column with the odd rows in the reading matrix.

3. A supervisory arrangement according to claim 1 wherein the selection of a row and/or a column in the selecting matrix is carried out through a logic circuit, the output signal of which is dependent on the fact that each of the inputs of the circuit is activated in identical groups by its own computer.

4. A supervisory arrangement according to claim 3 wherein one group of the inputs can be disconnected so that all inputs must be activated only in the other group in order to obtain an output signal from the logic circuit.

No references cited.

KATHLEEN H. CLAFFY, Primary Examiner

ARTHUR A. McGILL, Assistant Examiner